US012091838B2

(12) United States Patent
Kaluski et al.

(10) Patent No.: US 12,091,838 B2
(45) Date of Patent: Sep. 17, 2024

(54) WORKING MACHINE COMPRISING AN ILLUMINATION SYSTEM

(71) Applicant: Volvo Construction Equipment AB, Eskilstuna (SE)

(72) Inventors: Przemyslaw Kaluski, Wroclaw (PL); Jacek Kmieciak, Wroclaw (PL); Tomasz Sokolowski, Wroclaw (PL)

(73) Assignee: Volvo Construction Equipment AB, Eskilstuna (SE)

( * ) Notice: Subject to any disclaimer, the term of this patent is extended or adjusted under 35 U.S.C. 154(b) by 677 days.

(21) Appl. No.: 17/282,201

(22) PCT Filed: Oct. 4, 2018

(86) PCT No.: PCT/EP2018/077024
§ 371 (c)(1),
(2) Date: Apr. 1, 2021

(87) PCT Pub. No.: WO2020/069747
PCT Pub. Date: Apr. 9, 2020

(65) Prior Publication Data
US 2021/0340734 A1 Nov. 4, 2021

(51) Int. Cl.
*E02F 9/24* (2006.01)
*B60Q 1/24* (2006.01)
(Continued)

(52) U.S. Cl.
CPC .................. *E02F 9/24* (2013.01); *B60Q 1/24* (2013.01); *E02F 9/261* (2013.01); *G06V 10/95* (2022.01);
(Continued)

(58) Field of Classification Search
CPC .......... E02F 9/24; E02F 9/261; E02F 9/0858; B60Q 1/24; B60Q 2800/20; B60Q 1/2611;
(Continued)

(56) References Cited

U.S. PATENT DOCUMENTS

2005/0035881 A1 2/2005 Kohlmeiser-Beckmann et al.
2007/0171089 A1 7/2007 Small
(Continued)

FOREIGN PATENT DOCUMENTS

CA 3012615 A1 2/2012
GB 2533140 A * 6/2016 .......... A01B 69/008
(Continued)

OTHER PUBLICATIONS

International Search Report and Written Opinion of the International Searching Authority, PCT/EP2018/077024, mailed Jul. 7, 2019, 20 pages.
(Continued)

*Primary Examiner* — Russell Frejd
*Assistant Examiner* — Ana D Thomas
(74) *Attorney, Agent, or Firm* — Sage Patent Group

(57) ABSTRACT

The present disclosure generally relates to a working machine, including an illumination system adapted for illuminating an area externally of the working machine based on a dynamically determined safety light beam pattern. The present disclosure also relates to a corresponding illumination arrangement, a computer implemented method and a computer program product.

10 Claims, 3 Drawing Sheets

(51) Int. Cl.
    *E02F 9/26*     (2006.01)
    *G06V 10/94*     (2022.01)
    *G06V 20/10*     (2022.01)
    *G06V 20/17*     (2022.01)
    *G06V 20/52*     (2022.01)
    *G06V 20/58*     (2022.01)
    *G06V 40/10*     (2022.01)

(52) U.S. Cl.
    CPC ............ *G06V 20/17* (2022.01); *G06V 20/176* (2022.01); *G06V 20/52* (2022.01); *G06V 20/58* (2022.01); *G06V 40/103* (2022.01)

(58) Field of Classification Search
    CPC ...... G06V 10/95; G06V 20/17; G06V 20/176; G06V 20/52; G06V 20/58; G06V 40/103; F16P 3/142
    See application file for complete search history.

(56) References Cited

U.S. PATENT DOCUMENTS

| | | |
|---|---|---|
| 2008/0162004 A1 | 7/2008 | Price et al. |
| 2012/0025964 A1 | 2/2012 | Beggs et al. |
| 2016/0193920 A1 | 7/2016 | Tsubone et al. |
| 2016/0326724 A1 | 11/2016 | Hartman et al. |
| 2018/0001889 A1 | 1/2018 | Härslätt |
| 2018/0122218 A1* | 5/2018 | Shanley .................. E02F 9/262 |
| 2019/0161943 A1* | 5/2019 | Frank ......................... E02F 9/24 |
| 2020/0399863 A1* | 12/2020 | Aizawa .................. B60R 11/02 |
| 2021/0174660 A1* | 6/2021 | Kamimura ............... G08B 5/36 |

FOREIGN PATENT DOCUMENTS

| | | | |
|---|---|---|---|
| WO | WO-2016029246 A1 * | 3/2016 | .......... B66C 15/065 |
| WO | 2018038654 A1 | 3/2018 | |

OTHER PUBLICATIONS

Rahman, Md Mahbubur, et al., "An Automated Methodology for Worker Path Generation and Safety Assessment in Construction Projects," IEEE Transactions on Automation Science and Engineering, vol. 15, No. 2, Apr. 2018, pp. 479-491.

Baumgart, Stephan, et al., "Analyzing Hazards in System-of-Systems: Described in a Quarry Site Automation Context," 2017 Annual IEEE International Systems Conference (SYSCON), Apr. 24, 2017, 8 pages.

Office Action for Chinese Patent Application No. 201880098100.9 mailed Apr. 27, 2024, including English translation, 18 pages.

* cited by examiner

WORKING MACHINE COMPRISING AN ILLUMINATION SYSTEM

CROSS REFERENCE TO RELATED APPLICATIONS

This application is a 35 U.S.C. § 371 national stage application of PCT International Application No. PCT/EP2018/077024 filed on Oct. 4, 2018, the disclosure and content of which is incorporated by reference herein in its entirety.

TECHNICAL FIELD

The present disclosure generally relates to a working machine comprising an illumination system adapted for illuminating an area externally of the working machine based on a dynamically determined safety light beam pattern. The present disclosure also relates to a corresponding illumination arrangement, a computer implemented method and a computer program product.

BACKGROUND

There is an ongoing development to ensure a safe working environment for e.g. pedestrians and workers at a work site, in and around the vicinity of one or a plurality of working machines, such as for example including excavators and wheel loaders, or similar.

An example of an interesting solution in this regards is presented in US20120025964, disclosing a methodology for presenting warnings in potentially dangerous areas in a vicinity of a vehicle. Specifically, US20120025964 suggests means for allowing both passive and warning, where an active warning is formed by correlating pedestrian detection in a potentially dangerous area in relation to the vehicle. US20120025964 further suggests presenting warnings by means of at least one or a combination of audio and illumination means.

Even though the solution proposed in US20120025964 greatly reduces the risks for pedestrians or workers arranged in the close vicinity to a single vehicle, US20120025964 clearly fails to take into account the complex situation as is present at a work site where e.g. more than a single vehicle is collaborating to perform a work task. As such, there appears to be room for further improvements, further enhancing the personal safety for said worker or pedestrian.

SUMMARY

In accordance to an aspect of the present disclosure, the above is at least partly alleviated by means of a first working machine, comprising a working machine structure, a sensor system arranged at the working machine structure and adapted to monitor an environment external of the first working machine, an illumination system arranged at the working machine structure and adapted to illuminate an area externally of the first working machine, and a control unit connected to the sensor arrangement and the illumination arrangement, wherein the control unit is adapted to determine, based on information received from the sensor system, if an unprotected person is present in a predefined area surrounding the first working machine, receive, from a data source external of the first working machine, information indicative of a second working machine in the predefined area surrounding the first working machine, the information further comprising a hazardous area for the second working machine, correlate a hazardous area for the first working machine with the hazardous area for the second working machine, forming a correlated hazardous area, determine a movement path for the unprotected person outside of the correlated hazardous area, form a safety light beam pattern based on the determined movement path, and control the illumination system for illuminating the area externally of the first working machine based on the safety light beam pattern.

The present disclosure is based on the understanding that it is desirable to take a collaborative approach at a work site to ensure personal safety for e.g. a worker moving around at the work site comprising a plurality of working machines, where information collected in regards to more than a single working machine is used for forming a correlated (or combined) hazardous area around the plurality of working machines. Furthermore, it has been determined by the inventors that it is insufficient to present workers with general warnings in regards to the hazardous area in the vicinity of the working machines. Rather, it is safer and more effective to present the workers with a general instruction of where it is safe to move, using a safety light beam pattern to be visually presented at the area surrounding the working machines.

Accordingly, in line with the present disclosure a movement path is formed based on e.g. the location of unprotected persons/workers, and the safety light beam pattern is used for highlight to the unprotected persons/works where it is safe to move. In accordance to this aspect of the present disclosure the safety light beam pattern is emitted using an illumination system arranged at the first working machine, whereby it is possible to ensure that the "own" working machine (the first working machine) is able to provide adequate safety in and around its operational area.

It should however be understood, and as further exemplified below, that the safety light beam pattern also or alternatively may be emitted using a corresponding illumination system/arrangement position at e.g. a fixed structure at the work site, or from a further/other working machine operating at the work site. Furthermore, the illumination system may comprise one or a plurality of light sources capable of providing a visible illumination, including for example markings, icons, text, video, images, etc., in a vicinity of the working machine.

The illumination system may comprise different type of light sources, such as e.g. light emitting diodes (LED), or an array of LEDs, etc. Other alternatives are of course conceivable, such as e.g. lasers, image/video projectors, etc. The illumination system may also be arranged to provide a movable illumination pattern in relation to the working machine. Hence, the illumination system can controllably illuminate different positions in the vicinity of the working machine irrespective of the specific position of the working machine. Also, the illumination system can provide a visual illumination at different distances from the working machine. For example, the illumination system may be able to both illuminate a position in close proximity to the working machine, as well as a position a distance away from the working machine. The safety light beam pattern may also be selected to be presented as flashing light and colored light, or light with different level of intensity.

In line with the present disclosure, the control unit may in one embodiment be an electronic control unit (ECU) which is typically provided as an onboard component of the first working machine.

Also, within the context of the present disclosure it should be understood that the expression "unprotected person"

should be interpreted broadly, including a person moving by foot within the vicinity of the working machine, or otherwise situated such that the working machine could impose harm to the person.

Additionally, in line with the present disclosure it should be understood that the information indicative of a second working machine in the predefined area surrounding the first working machine may be transmitted from the second working machine to the first working machine. However, the information indicative of a second working machine in the predefined area surrounding the first working machine may also or alternatively be formed using other means adapted to "surveille" the predefined area surrounding the first working machine. Such means may for example include sensor means arranged at fixed structures at the work site, or by means of e.g. a drone or similar adapted to hover above and around the first and the second working machine.

The concept according to the present disclosure is generally defined to be applicable to working machines arranged at a work site. Such a working machine may for example comprise an excavator, a wheel loader, an articulated hauler, a dozer, a grader and a backhoe loader, or any form of corresponding construction equipment.

In line with the above discussion, the first working machine may additionally comprise a wireless transceiver for allowing wireless communication with the data source arranged external of the firs working machine. The wireless transceiver may for example be adapted for allowing at least one of V2V, V2I and V2X communication. It should be stressed that any type of general communication protocol may be used for allowing direct communication between e.g. the first working machine, the first working machine and an infrastructure component (and back), the first working machine and the above mentioned drone, etc.

In an embodiment of the present disclosure, the sensor system comprises at least a camera. One camera may be arranged with the first working machine, and e.g. a second camera may be provided with the infrastructure component or the mentioned drone. The infrastructure component and/or the drone may wirelessly stream images (or video) to the first working machine, where the ECU of the first working machine may be adapted to implement image processing schemes for determining the information relating to the hazardous area for the second working machine. As an alternatively, the infrastructure component and/or the drone may wirelessly stream images (or video) to an external server (such as a cloud server) where such determinations are made. As a further alternative, the infrastructure component and/or the drone comprise computational means for determine the information relating to the hazardous area for the second working machine.

Within the context of the present disclosure it should be understood that the hazardous area for the first working machine may be dependent on planned or previous operation of the first working machine. That is, it may in line with the present disclosure be desirable to allow the safety light beam pattern to take into account also an action to be taken by the first (and/or second working machine) in the "near" future, such as within the next 0-10 minutes. Accordingly, the unprotected person will know that it is safe to move at the work site according to the safety light beam pattern without any stress in moving. Similarly, the hazardous area for at least one of the first and the second working machine is formed based on a prediction of an operation of the first and the second working machine, respectively, within a predetermined time range, for example within the next 0-10 minutes.

According to another aspect of the present disclosure, there is provided an illumination arrangement for a work site where at least a first and a second working machine are operating, the illumination arrangement comprising a sensor system, an illumination system, a server arranged in communication with the sensor system and the illumination system, wherein the server is adapted to determine, based on information received from the sensor system, if an unprotected person is present in a predefined area surrounding at least one of the first and the second working machine, determine a correlated hazardous area for the first and the second working machine based on a present or predicted operation of the first and the second working machine, determine a movement path for the unprotected person outside of the correlated hazardous area, form a safety light beam pattern based on the determined movement path, and control the illumination system for illuminating an area of the work site based on the safety light beam pattern. This aspect of the present disclosure provides similar advantages as discussed above in relation to the previous aspect of the present disclosure.

According to a still further aspect of the present disclosure, there is provided a computer implemented method for controlling an illumination arrangement for a work site where at least a first and a second working machine are operating, comprising the steps of determining, based on information received from a sensor system, if an unprotected person is present in a predefined area surrounding at least one of the first and the second working machine, determining a correlated hazardous area for the first and the second working machine based on a present or predicted operation of the first and the second working machine, determining a movement path for the unprotected person outside of the correlated hazardous area, forming a safety light beam pattern based on the determined movement path, and controlling an illumination system comprised with the illumination arrangement for illuminating an area of the work site based on the safety light beam pattern. Also this aspect of the present disclosure provides similar advantages as discussed above in relation to the previous aspects of the present disclosure.

According to an additional aspect of the present disclosure, there is provided a computer program product comprising a non-transitory computer readable medium having stored thereon computer program means for controlling an illumination arrangement for a work site where at least a first and a second working machine are operating, wherein the computer program product comprises code for determining, based on information received from a sensor system, if an unprotected person is present in a predefined area surrounding at least one of the first and the second working machine, code for determining a correlated hazardous area for the first and the second working machine based on a present or predicted operation of the first and the second working machine, code for determining a movement path for the unprotected person outside of the correlated hazardous area, code for forming a safety light beam pattern based on the determined movement path, and code for controlling an illumination system comprised with the illumination arrangement for illuminating an area of the work site based on the safety light beam pattern. Also this aspect of the present disclosure provides similar advantages as discussed above in relation to the previous aspects of the present disclosure.

A software executed by the server for operation in accordance to the present disclosure may be stored on a computer readable medium, being any type of memory device, including one of a removable nonvolatile random access memory, a hard disk drive, a floppy disk, a CD-ROM, a DVD-ROM, a USB memory, an SD memory card, or a similar computer readable medium known in the art.

Further advantages and advantageous features of the present disclosure are disclosed in the following description and in the dependent claims.

BRIEF DESCRIPTION OF THE DRAWINGS

With reference to the appended drawings, below follows a more detailed description of embodiments of the present disclosure cited as examples.

In the drawings.

DETAILED DESCRIPTION

Figure 1:
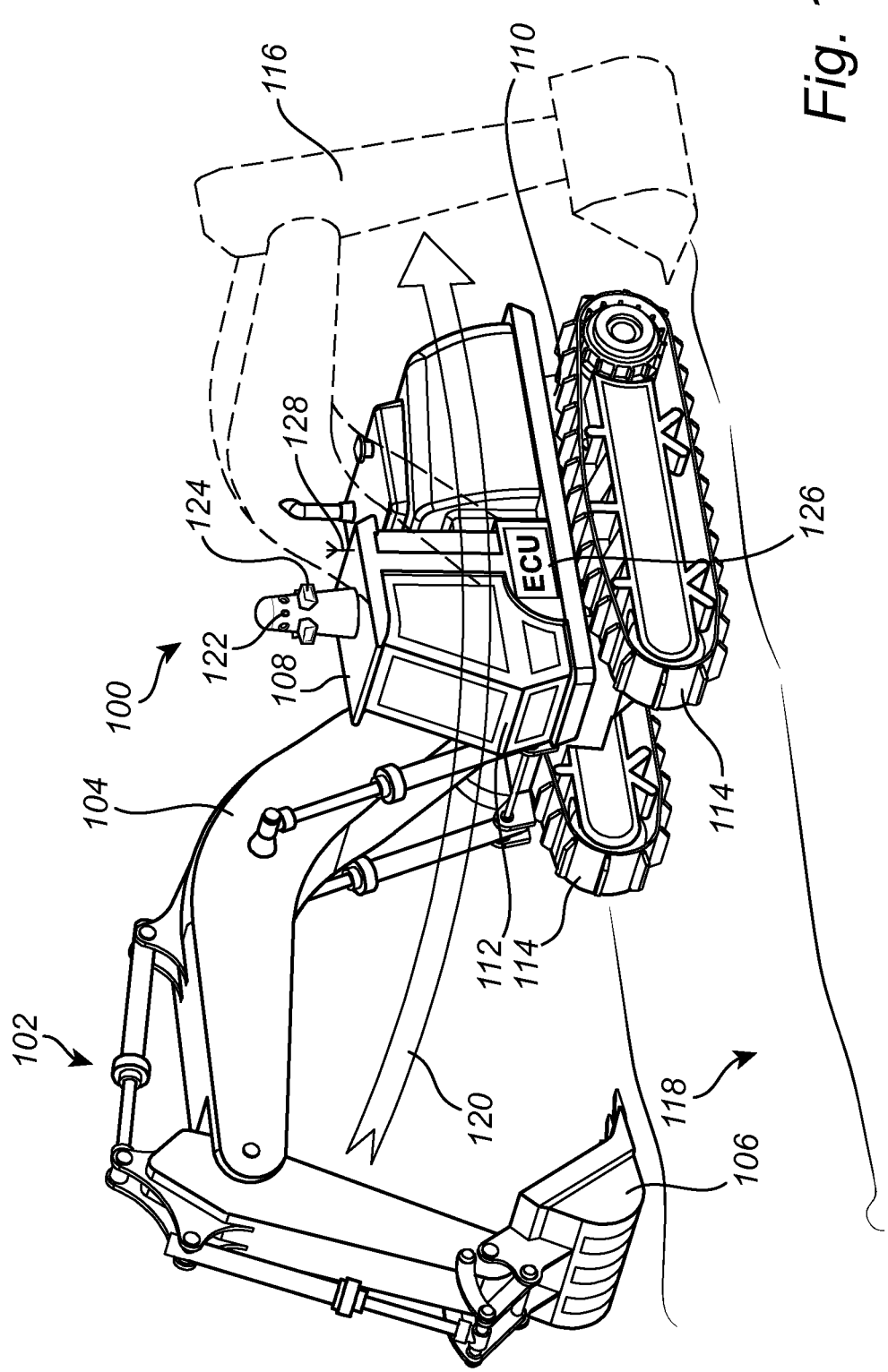
FIG. 1 provides an illustrative example of a first working machine according an exemplary embodiment of the present disclosure.

The present disclosure will now be described more fully hereinafter with reference to the accompanying drawings, in which currently preferred embodiments of the present disclosure are shown. This disclosure may, however, be embodied in many different forms and should not be construed as limited to the embodiments set forth herein; rather, these embodiments are provided for thoroughness and completeness, and fully convey the scope of the disclosure to the skilled addressee. Like reference characters refer to like elements throughout.

Referring now to the drawings and to FIG. 1 in particular, there is conceptually depicted a first working machine 100 in the form of an excavator 100. It should be understood that the excavator 100 is just an example of one type of working machine. Accordingly, other types or working machines are possible and within the scope of the present disclosure, including for example wheel loaders, articulated haulers, dozers, graders, backhoe loaders, or any other form of corresponding construction equipment that may operate at a work site.

The excavator 100 comprises movable load unit arrangement 102, which movable load unit arrangement 102 comprises a working machine means, exemplified as boom arm 104 and an implement 106. In the embodiment depicted in FIG. 1, the implement 106 is a bucket, although other implements are conceivable as well, such as e.g. a gripping tool, etc. The excavator 100 comprises a working machine structure including an upper structure 108 and a lower structure 110, wherein the upper 108 and lower 110 structures are movable relative to each other. In detail, the upper structure 108 can rotate relative the lower structure 110 around a substantially vertical geometric axis (not shown).

The load unit arrangement 102 is connected to the upper structure 108 of the excavator 100, which makes it rotatably movable relative to the lower structure 110 as well as relative to the ground surface 118 thereof. The load unit arrangement 102 can also be lifted and lowered relative to the ground surface 118 such that the distance between the implement 106 and the ground surface 118 increases/reduces. In addition, the implement 106 can be tilted relative to the boom arm 104. As further illustrated in FIG. 1, the upper structure 108 comprises a compartment 112 for housing an operator of the excavator 100, while the lower structure 110 comprises a pair of ground engaging members 114 in the form of caterpillar treads 114. Other ground engaging members 114 are also conceivable, such as e.g. wheels, etc.

As described, the load unit arrangement 102 is movable relative to the lower structure 110, as well as relative to the ground surface 118. FIG. 1 depicts the movement from a first, present point in time at which the load unit arrangement 102 is depicted with solid lines, to a future point in time. The load unit arrangement 102 is depicted with dashed lines 116 at the future point in time. The movement from the present position to the future position is depicted by arrow 120.

The working machine 100 further comprises a sensor system 122 and an illumination system 124 exemplary arranged at the upper structure 108 of the working machine 100. The sensor system 122 and an illumination system 124 are adapted to be connected to a control unit, such as an electronic control unit (ECU) 126 comprised with the first working machine 100.

The sensor system 122 may for example comprise a three-dimensional (3D) camera adapted to be used for forming a 3D representation of the surrounding of the first working machine 100. Similarly, the illumination system 124 may comprise one of or a combination of light emitting diodes (LED), an array of LEDs, lasers, etc., adapted to project the above discussed safety light beam pattern e.g. onto the ground surface 118 in the vicinity of the first working machine 100.

The ECU 126 may for example be manifested as a general-purpose processor, an application specific processor, a circuit containing processing components, a group of distributed processing components, a group of distributed computers configured for processing, a field programmable gate array (FPGA), etc.

The processor may be or include any number of hardware components for conducting data or signal processing or for executing computer code stored in memory. The memory may be one or more devices for storing data and/or computer code for completing or facilitating the various methods described in the present description. The memory may include volatile memory or non-volatile memory. The memory may include database components, object code components, script components, or any other type of information structure for supporting the various activities of the present description.

According to an exemplary embodiment, any distributed or local memory device may be utilized with the systems and methods of this description. According to an exemplary embodiment the memory is communicably connected to the processor (e.g., via a circuit or any other wired, wireless, or network connection) and includes computer code for executing one or more processes described herein.

The ECU 126 is also adapted to receive information indicative of a second working machine (not shown in FIG. 1) in an area surrounding the first working machine 100, the information further comprising a hazardous area for the second working machine. The information indicative of a second working machine is preferably received from a data source external of the first working machine 100 using a wireless transceiver (including a thereto related antenna 128), as exemplified in FIG. 1. The transceiver is also connected to the ECU 126.

The ECU 126 may further be adapted to receive information indicative of a present location of the first working machine 100, such as from a geolocation arrangement (not shown) comprised with the first working machine 100. The geolocation arrangement may for example comprise a GPS receiver or a local positioning arrangement at a construction site, such as for example a Wi-Fi positioning system. It may, as understood by the skilled addressee, be necessary to use an alternative to satellite navigation in case the working machine is operating underground, such as for example in a mine or similar.

Figure 2:
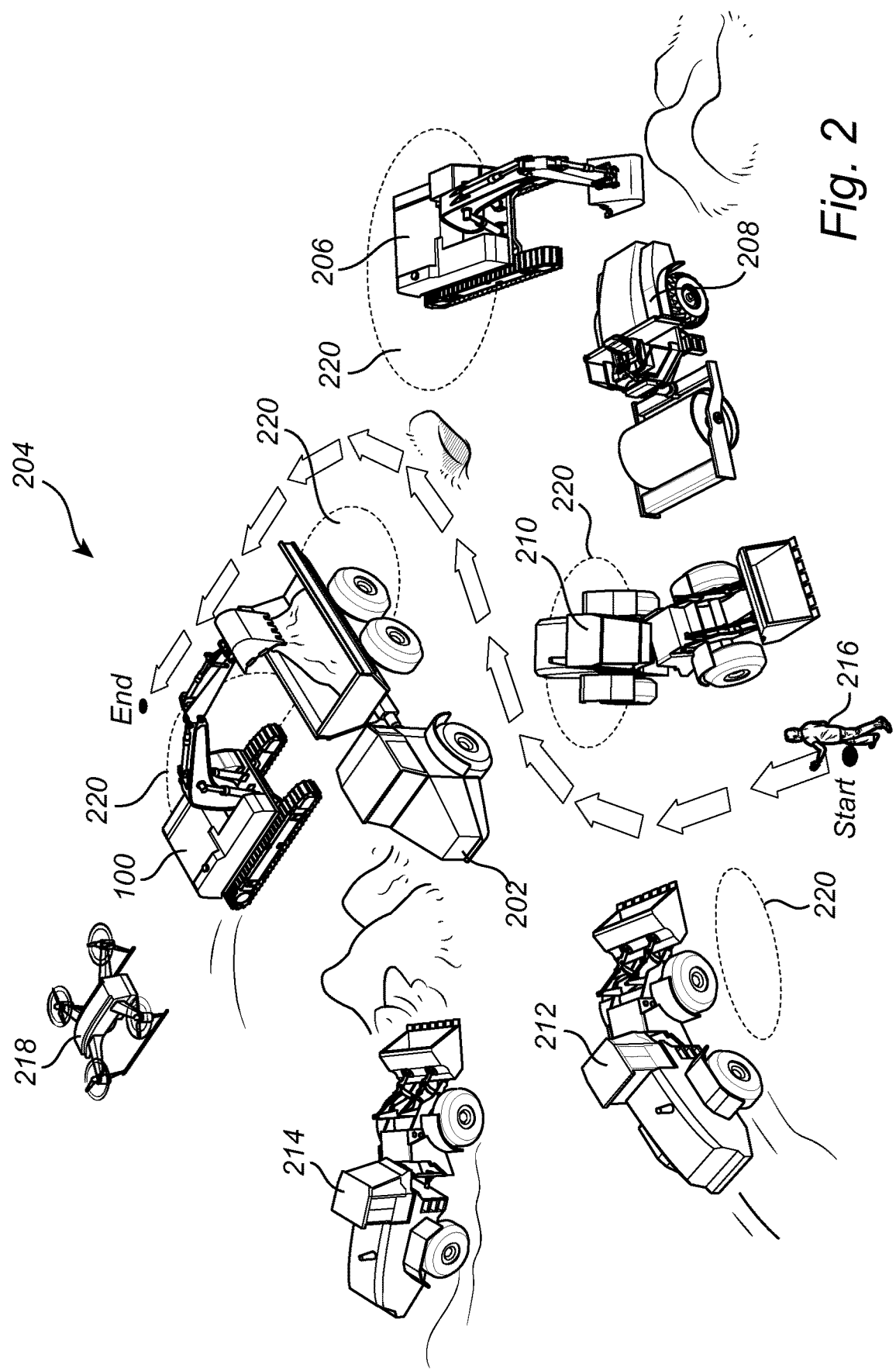
FIG. 2 conceptually illustrates a work site comprising a plurality of working machines, arranged in accordance to the present disclosure.
Figure 3:
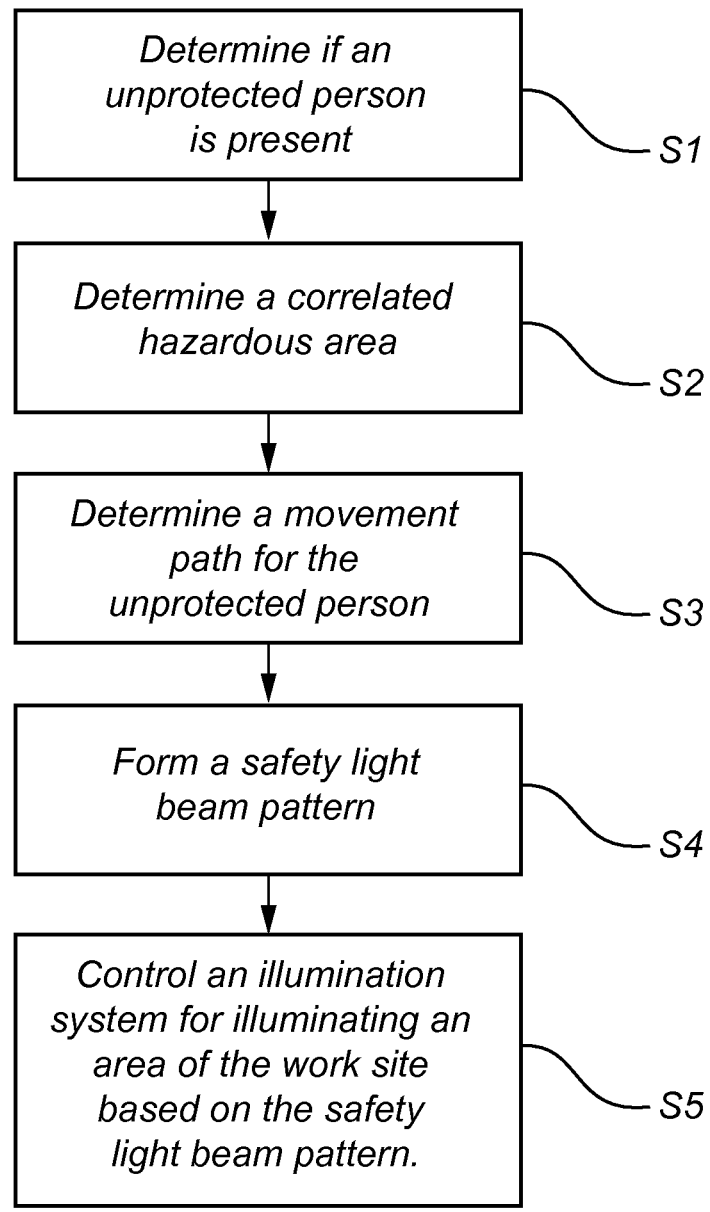
FIG. 3 shows a flow chart of a method according to an embodiment of the present disclosure.

During general operation of the first working machine 100, with further reference to FIGS. 2 and 3, the first working machine 100 is arranged with at least a second working machine 202 at a work site 204. In the illustration provided in relation to FIG. 2, the work site 204 comprises not only the first 100, and the second 202 working machine, but also a further plurality of working machines exemplified as 206, 208, 210, 212 and 214. An unprotected person 216 is shown to have an intention to pass through the work site 204, in between the plurality of working machines 100, 202, 206, 208, 210, 212 and 214 from a start position to an end position.

There is in addition to the working machine 100, 202, 206, 208, 210, 212 and 214 provided a drone 218 arranged to hover in an around the work site 204, where the drone 218 is arranged to identify the position of the unprotected person 216 as well as possibly identify hazardous areas 220 for the 100, 202, 206, 208, 210, 212 and 214. Also the 3D camera 124 (or other sensor means) comprised with the first working machine 100 may identify, S1, the presence of the unprotected person 216.

The first working machine 100 is arranged to wirelessly receive, S2, information indicative of the second working machine 202 from at least one of the second working machine 202, the drone 218 or the further working machines 206, 208, 210, 212 and 214. The information further comprising the hazardous area 220 for the second working machine 202 (or any other of the further working machines 206, 208, 210, 212 and 214 also seen as a second working machine within the context of the present disclosure).

Once the information has been received by the first working machine 100, the ECU 126 correlates, S3, the hazardous area 220 for the first working machine 100 with the hazardous area 220 for the second working machine 202, forming a correlated hazardous area. Based on the location of the unprotected person 216 and the correlated hazardous area the ECU 126 determines, S4, a movement path 222 for the unprotected person 216 outside of the correlated hazardous area, and forms, S5, a safety light beam pattern based on the determined movement path 222.

In the example presented in FIG. 2 the illumination system 124 is then controlled, S6, by the ECU 126 for illuminating the area externally of the first working machine based on the safety light beam pattern, i.e. the movement path 222. As is shown in FIG. 2, a plurality of "arrows" are projected at the ground surface 118 of the work site 204, ensuring that the unprotected person 216 may pass through the work site 204 in a safe manner.

It should be understood that the movement path 222 may be formed to ensure that also dangerous areas not relating to the plurality of working machines 100, 202, 206, 208, 210, 212 and 214 are taken into account. Accordingly, the movement path 222 may for example be adapted to ensure that the unprotected person 216 is instructed to move outside of e.g. obstacles, holes, etc., at the work site 204. Such obstacles, holes, etc. may for example be located by the 3D camera 122, the drone 218, etc.

It should further be understood that the "other" working machines (i.e. the second 202 as well as the further 206, 208, 210, 212 and 214 working machines) typically may be arranged to implement a similar concept as the first working machine 100. Accordingly, each of the working machines 100, 202, 206, 208, 210, 212 and 214 may for example be arranged to form separate portions of the illumination pattern to be projected at the ground surface 118. Thus, e.g. the first working machine 100 will illuminate a first portion of the "safe path", the second working machine 202 a second portion of the safe path, etc. In total the working machines 100, 202, 206, 208, 210, 212 and 214 will illuminate a complete safe path for allowing the unprotected person 216 to move through the work site 202.

In summary, the present disclosure relates to a first working machine 100, comprising a working machine structure 108, 110, a sensor system 122 arranged at the working machine structure 108, 110, and adapted to monitor an environment external of the first working machine 100, an illumination system 124 arranged at the working machine structure 108, 110, and adapted to illuminate an area externally of the first working machine 100, and a control unit 126 connected to the sensor arrangement 122 and the illumination arrangement 124, wherein the control unit 126 is adapted to determine, based on information received from the sensor system 122, if an unprotected person 216 is present in a predefined area surrounding the first working machine 100, receive, from a data source 202, 206, 208, 210, 212, 214 and 218 external of the first working machine 100, information indicative of a second working machine 202 in the predefined area surrounding the first working machine 100, the information further comprising a hazardous area 220 for the second working machine 202, correlate a hazardous area 202 for the first working machine 100 with the hazardous area 220 for the second working machine 202, forming a correlated hazardous area, determine a movement path 222 for the unprotected person 216 outside of the correlated hazardous area, form a safety light beam pattern based on the determined movement path, and control the illumination system 124 for illuminating the area externally of the first working machine based on the safety light beam pattern.

Advantages following by means of the present disclosure include the possibility to provide an unprotected person moving in a vicinity to the first working machine with a safe movement path that is indicated by means of a safety light beam pattern that is used for highlighting to the unprotected person where it is safe to move. Accordingly, the present disclosure allows for safe movement within an operational area surrounding the "own" working machine (the first working machine).

Even though the present disclosure mainly has been presented in relation to the first working machine 100, it should be understood that the general concept according to the present disclosure and operating in line with the above elaboration may be implemented as an illumination arrangement for the work site 204 where at least the first 100 and the second 202 working machine are operating. As such, such an illumination arrangement comprises a sensor system for example comprising a 3D camera 122 and an illumination system 124 as discussed above. The 3D camera 122 and the illumination system 124 are for example connected to a server, such as the above mentioned cloud server, where the server is adapted to implement the concept according to the present disclosure.

The illumination arrangement according to the present disclosure may for example be arranged at a fixed structure provided at the work site 202, such as at e.g. a light-post arranged at an elevated position at the work site 202.

The present disclosure contemplates methods, devices and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor.

By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data that cause a general-purpose computer, special purpose computer, or special purpose processing machines to perform a certain function or group of functions.

Although the figures may show a specific order of method steps, the order of the steps may differ from what is depicted. In addition, two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps and decision steps. Additionally, even though the disclosure has been described with reference to specific exemplifying embodiments thereof, many different alterations, modifications and the like will become apparent for those skilled in the art.

Variations to the disclosed embodiments can be understood and effected by the skilled addressee in practicing the claimed disclosure, from a study of the drawings, the disclosure, and the appended claims. Furthermore, in the claims, the word "comprising" does not exclude other elements or steps, and the indefinite article "a" or "an" does not exclude a plurality.

The invention claimed is:

1. A first working machine, comprising:
   a working machine structure,
   a sensor system arranged at the working machine structure and adapted to monitor an environment external of the first working machine,
   an illumination system arranged at the working machine structure and adapted to illuminate an area externally of the first working machine, and
   a control unit connected to the sensor arrangement and the illumination arrangement, wherein the control unit is adapted to:
   determine, based on information received from the sensor system, if an unprotected person moving by foot is present in a predefined area surrounding and being in a vicinity of the first working machine,
   receive, from a data source external of the first working machine, information indicative of a second working machine in the predefined area surrounding the first working machine, the information further comprising a hazardous area for the second working machine,
   correlate a hazardous area for the first working machine with the hazardous area for the second working machine, forming a correlated hazardous area,
   determine a movement path for the person moving by foot outside of the correlated hazardous area,
   form a safety light beam pattern based on the determined movement path, and
   control the illumination system for illuminating the area externally of the first working machine with the safety light beam pattern using flashing light and colored light, or light with different level of intensity to highlight to the person moving by foot where it is safe to move.

2. The first working machine according to claim 1, wherein the sensor system comprises at least a camera.

3. The first working machine according to claim 1, wherein the data source external of the first working machine is comprised with the second working machine.

4. The first working machine according to claim 1, wherein the data source external of the first working machine is also external from the second working machine.

5. The first working machine according to claim 1, wherein the information indicative of the second working machine in the predefined area surrounding the first working machine is generated by at least one of a drone with a camera and a fixed camera arrangement provided in the surrounding of the first working machine.

6. The first working machine according to claim 1, wherein the hazardous area for the first working machine is dependent on planned or previous operation of the first working machine.

7. The first working machine according to claim 1, wherein the hazardous area for the first working machine is dependent on an implement comprised with the first working machine.

8. The first working machine according to claim 1, wherein the hazardous area for at least one of the first and the second working machine is formed based on a prediction of an operation of the first and the second working machine, respectively, within a predetermined time range.

9. The first working machine according to claim 8, wherein the time range is 0-10 minutes.

10. The first working machine according to claim 1, wherein the control unit is further adapted to:
    form a hazard light beam pattern based on the correlated hazardous area, and
    control the illumination system for illuminating at least a portion of the area externally of the first working machine based on the hazard light beam pattern.

* * * * *